D. STEPHEN.
METHOD OF MAKING RUBBER FLOAT BALL VALVES.
APPLICATION FILED OCT. 24, 1913.
1,158,009. Patented Oct. 26, 1915.
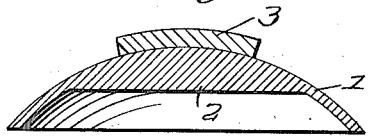
Fig. 1.
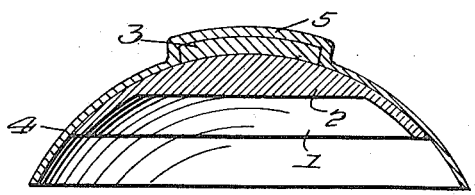
Fig. 3.
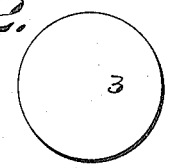
Fig. 2.
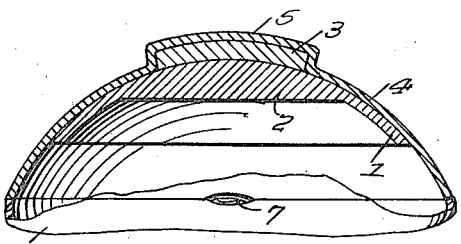
Fig. 4.
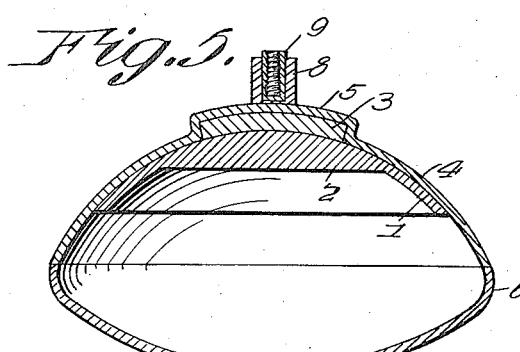
Fig. 5.
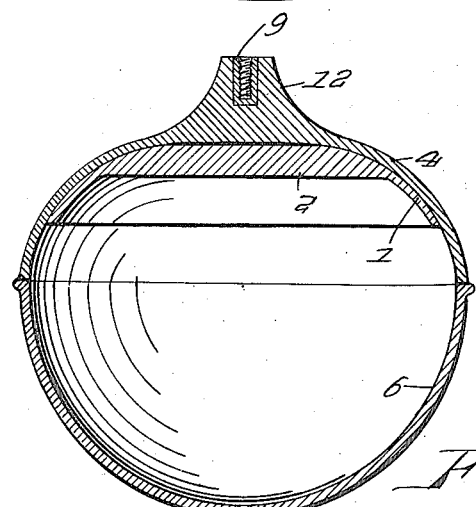
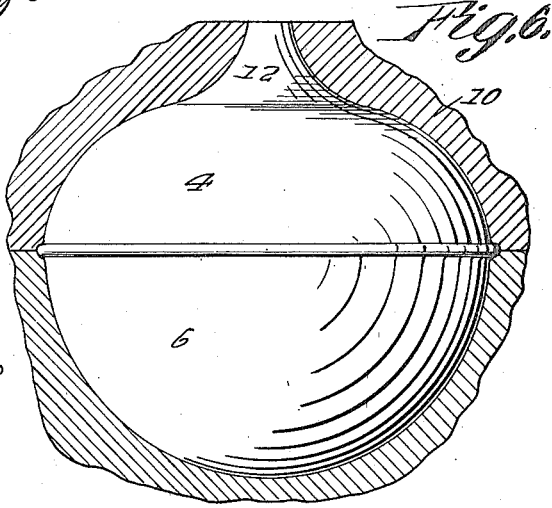
Fig. 6.
Fig. 7.
Witnesses
M. I. Lougdew
Anna D. Smith
Inventor
David Stephen,
By
Attorney

UNITED STATES PATENT OFFICE.

DAVID STEPHEN, OF STRATFORD, CONNECTICUT, ASSIGNOR TO THE H. O. CANFIELD CO., OF BRIDGEPORT, CONNECTICUT, A CORPORATION OF CONNECTICUT.

METHOD OF MAKING RUBBER FLOAT-BALL VALVES.

1,158,009. Specification of Letters Patent. Patented Oct. 26, 1915.

Application filed October 24, 1913. Serial No. 797,095.

*To all whom it may concern:*

Be it known that I, DAVID STEPHEN, a citizen of the United States, residing in the town of Stratford, county of Fairfield, State of Connecticut, have invented certain new and useful Improvements in Methods of Making Rubber Float-Ball Valves; and I do declare the following to be a full, clear, and exact description of the invention, such as will enable others skilled in the art to which it appertains to make and use the same.

This invention relates to an improved method of making float ball valves, and relates more particularly to float ball valves of the type used in connection with the valve seats of water closets.

The primary object of the invention is to incorporate a rubber stiffening element in the ball so that collapsing thereof will be effectually prevented, at the same time preserving a proper degree of softness and resiliency so that the ball will seat firmly against a valve seat.

In the drawings: Figure 1 is a sectional view of the rubber stiffening element, showing the unvulcanized block secured thereto; Fig. 2 is a top plan view of the unvulcanized block, shown in Fig. 1; Fig. 3 is a sectional view of the parts after the large rubber disk has been applied thereto, which disk forms the upper part of the ball; Fig. 4 is a similar view, showing the rubber disk which forms the lower part of the ball applied to the disk which forms the upper part; Fig. 5 is a view showing the parts as assembled in Fig. 4, in inflated or expanded position; Fig. 6 is a fragmentary sectional view of a mold showing the structure therein as same appears when the vulcanizing has been completed; and Fig. 7 is a vertical sectional view of the complete ball.

In proceeding in accordance with the present method, a rubber back piece 1, of substantially concavo-convex cross-section, is vulcanized to the proper degree of stiffness, a reinforcement 2, being provided which extends on the inner concave face of the rubber piece 1, which latter is preferably of substantially circular outline. A small block 3, of unvulcanized rubber is then centrally cemented to the upper or outer convex face of the rubber piece 1, whereupon a large unvulcanized rubber disk 4, is placed over the small block 3, cement being first applied so as to effect adhesion between the piece of rubber 1 and the large rubber disk 4, the operator manually kneading the central portion of the disk 4 about the block 3, so that said disk will be provided with a swelling or protuberance 5 which incloses the small block 3, as depicted in Figs. 3, 4, and 5, of the drawings.

The parts assembled in the manner above described, are, at this stage of the method, related and possessed of the form illustrated in Fig. 3, of the drawings.

The next step in the method is to unite the free edge of a comparatively large unvulcanized rubber disk 6, to the peripheral edge of the disk 4, which union is effected by kneading said edges together except at the point 7, which latter is left open to provide an inlet that acts as a medium of communication with the interior of the structure which has thus far resulted.

The next step in the method is to cement to the outer face of the protuberance 5 a nub 8 of unvulcanized rubber, which nub is preferably though not necessarily of cylindrical form and has suitably secured therein an interiorly threaded metal thimble 9.

The operator next applies to the inlet opening 7, the nozzle of an air bulb, or the like, and therewith forces a quantity of air into the interior of the structure to cause the latter to expand from the position shown in Fig. 4 to that shown in Fig. 5, after which the operator removes the air bulb and quickly pinches the walls which define the opening 7 together, thus effectually sealing the structure against communication with the external atmosphere.

The structure thus formed, which has assumed the shape illustrated in Fig. 5 of the drawings, is then placed within a mold 10, depicted in Fig. 6, which mold possesses the shape which the completed article is to have. The mold is heated, thereby causing the gases contained in the structure to expand, the expansion of the gases forcing the structure against the walls of the mold, enabling the heat to properly vulcanize the same. Upon proper vulcanization of the structure, the mold is withdrawn from the heat and immediately cooled in order to prevent undue expansion of the gases such as might burst the structure. The article thus completed is pierced at 11 to allow the escape of the gases from the interior thereof and the replacement of such gases by air.

During the vulcanizing process, the block 3, the protuberance 5 and the nub 8 will merge so as to form sufficient stock to provide the boss 12, which latter serves as a reinforce and also provides a firm and effective anchorage for the metal thimble 9.

An important feature of the present invention is the prevulcanizing of the back piece 1 so that it is of a degree of stiffness greater than would result were said piece vulcanized to the same degree as that to which the ball itself is vulcanized. If all the parts were primarily unvulcanized and the vulcanization of the entire structure were carried to a point sufficient to properly vulcanize the back piece 1, then the ball would be too hard and would not seat and cushion in a satisfactory manner against the valve seat of the tank water supply. On the other hand, if all the parts were primarily unvulcanized, and if the vulcanization were only carried to an extent sufficient to give the ball proper stiffness, then the back piece 1 would not be possessed of sufficient rigidity or stiffness to prevent collapse of the ball, which latter objection prevails in most balls as now made. It has been proposed heretofore, to employ foreign material, such as metal and wood, in lieu of the back piece 1, to impart to the ball the proper stiffness to prevent collapse thereof, but the objection to the use of foreign material is that the same will not form a permanent or satisfactory connection with the rubber, and in addition become loose, in some cases causing disintegration of the rubber, aside from the item of expense which the use of foreign material involves in this connection.

What is claimed is:—

1. A method of making rubber float ball valves, which consists in cementing to the outer face of a vulcanized back piece of rubber an unvulcanized rubber block, then in cementing an unvulcanized rubber disk which is to form the upper half of the ball over and upon said back piece and block and in kneading said disk about the block so as to provide a protuberance on said disk, then in cementing an unvulcanized rubber nub containing a metal thimble to the outer face of said protuberance, then kneading the periphery of said disk to the periphery of a second unvulcanized rubber disk which is to form the lower half of the ball, then inflating the structure thus formed, sealing same, and placing it in a heated mold for vulcanization, withdrawing the mold from the heat after vulcanization and cooling said mold, and releasing the gases formed by the heating in the mold.

2. The method of making float ball valves, which consists in cementing an unvulcanized rubber block to the outer face of a vulcanized back piece of rubber, cementing a disk of unvulcanized rubber to said vulcanized back piece and unvulcanized block so that the latter will form a protuberance in said disk, uniting the edge of said disk to the edge of a second disk of unvulcanized rubber, partially inflating the structure thus formed and vulcanizing the same.

3. The method of making float ball valves, which consists in cementing an unvulcanized disk of rubber which is to form the upper half of the ball to a vulcanized reinforcing piece of rubber which is to stiffen the ball, forming a protuberance which extends outwardly from the central portion of said disk, then in joining the edge of an unvulcanized disk of rubber which is to form the lower half of the ball to the edge of the disk which is to form said upper half of the ball, and then in vulcanizing the unvulcanized pieces.

4. The method of making float ball valves, which consists in cementing the inner face of an unvulcanized disk of rubber which is to form the upper half of the ball to a vulcanized reinforcing piece of rubber, cementing an unvulcanized rubber nub containing a thimble to the central outer face of said unvulcanized disk of rubber, kneading the edge of said disk to the edge of a second unvulcanized rubber disk which latter is to form the lower half of the ball, and finally vulcanizing the structure thus formed.

5. The process of making bulbs for tank valves, comprising first forming a supporting or stiffening element for the upper portion of the bulb; applying to the part so formed the outer upper portion of the bulb, said upper portion being formed from vulcanizable rubber stock; attaching to said upper portion a lower valve-seating portion of rubber stock likewise susceptible of vulcanization; and then vulcanizing the whole.

6. The process of making bulbs for tank valves, comprising, first forming a core for the upper portion thereof out of rubber stock capable of being vulcanized, vulcanizing the same, applying to the part so formed an adhesive material, covering the outer surface thereof with a sheet of rubber stock capable of being vulcanized, attaching to said upper portion a hemispherical portion of the last named rubber stock, and then vulcanizing the whole.

7. The process of making bulbs for tank valves, comprising first forming a support for the upper portion thereof, applying to the part so formed by means of a suitable adhesive a covering of rubber stock, attaching to said upper portion a hemispherical lower portion of rubber stock capable of being vulcanized, and then vulcanizing the whole.

8. The process of making rubber bulbs for tank valves, which consists in superimposing a substantially hemispherical section of uncured rubber upon a reinforcing member of partially cured rubber; bringing a lower section into juxtaposition with the lower portion of said hemispherical section; and finally vulcanizing the parts.

9. The process of making rubber bulbs for tank valves, which consists in superimposing, and securing by a vulcanizable cement, a substantially hemispherical section of uncured rubber upon a reinforcing member of partially cured rubber, producing a lower hemispherical section of uncured rubber; bringing the margins or edges of said sections together; and finally vulcanizing the parts.

In testimony whereof I affix my signature in presence of two witnesses.

DAVID STEPHEN.

Witnesses:
G. E. MELIUS,
H. A. MAYSE.